(12) United States Patent
Herreria et al.

(10) Patent No.: US 10,374,905 B2
(45) Date of Patent: Aug. 6, 2019

(54) SYSTEM AND METHOD FOR INTELLIGENTLY MAPPING A SOURCE ELEMENT TO A TARGET ELEMENT IN AN INTEGRATION CLOUD SERVICE DESIGN TIME

(71) Applicant: Oracle International Corporation, Redwood Shores, CA (US)

(72) Inventors: Jorge Herreria, Denver, CO (US); Thomas Hora, Parker, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 199 days.

(21) Appl. No.: 15/171,894

(22) Filed: Jun. 2, 2016

(65) Prior Publication Data

US 2016/0359689 A1 Dec. 8, 2016

Related U.S. Application Data

(60) Provisional application No. 62/171,769, filed on Jun. 5, 2015.

(51) Int. Cl.
*G06F 15/173* (2006.01)
*H04L 12/24* (2006.01)
(Continued)

(52) U.S. Cl.
CPC ............ *H04L 41/22* (2013.01); *G06F 3/0486* (2013.01); *G06F 3/04847* (2013.01); *G06F 8/34* (2013.01);
(Continued)

(58) Field of Classification Search
None
See application file for complete search history.

(56) References Cited

U.S. PATENT DOCUMENTS 6,256,676 B1 7/2001 Taylor
7,257,818 B2 8/2007 Foerg
(Continued)

FOREIGN PATENT DOCUMENTS

WO 2005114393 1/2005

OTHER PUBLICATIONS

European Patent Office, International Searching Authority, International Search Report and Written Opinion for PCT/US2016/035743 dated Sep. 8, 2016, 11 Pages.

*Primary Examiner* — Umar Cheema
*Assistant Examiner* — Gregory P Tolchinsky
(74) *Attorney, Agent, or Firm* — Tucker Ellis LLP

(57) ABSTRACT

In accordance with an embodiment, described herein is a system and method for creating advanced mappings between a source application and a target application in a design time of a cloud-based integration service. The web interface application in the design time can display a source data object including one or more source elements, a target data object including one or more target elements, and a plurality of mapping components. A mapping area for a particular target element can include a mapping expression between a source element and the particular target element. When a mapping component is dragged and dropped onto the mapping area, an application programming interface defining one or more actions in accordance with a plurality of rules can be triggered, to generate one or more mapping statements to modify the mapping expression to create an advanced mapping between the source element and the target element.

20 Claims, 12 Drawing Sheets

(51) Int. Cl.
*G06F 8/34* (2018.01)
*G06F 3/0484* (2013.01)
*G06F 3/0486* (2013.01)
*G06F 17/22* (2006.01)
*H04L 29/08* (2006.01)
*G06F 16/25* (2019.01)
*G06F 16/242* (2019.01)

(52) U.S. Cl.
CPC ........ *G06F 16/2428* (2019.01); *G06F 16/258* (2019.01); *G06F 17/227* (2013.01); *H04L 67/02* (2013.01); *H04L 67/10* (2013.01); *H04L 67/16* (2013.01)

(56) References Cited

U.S. PATENT DOCUMENTS

| | | | |
|---|---|---|---|
| 8,788,931 B1* | 7/2014 | Chen | G06F 17/2264 715/234 |
| 9,367,595 B1* | 6/2016 | Malks | G06F 17/30569 |
| 9,882,844 B2 | 1/2018 | Granshaw | |
| 2002/0116531 A1* | 8/2002 | Chu | G06Q 30/02 709/246 |
| 2004/0044729 A1 | 3/2004 | Foerg | |
| 2008/0034010 A1 | 2/2008 | Quan | |
| 2009/0125833 A1* | 5/2009 | Abernethy, Jr. | G06F 9/451 715/779 |
| 2010/0042670 A1* | 2/2010 | Kamalakantha | G06F 9/5072 709/203 |
| 2010/0256994 A1 | 10/2010 | Eisenberger | |
| 2012/0030275 A1* | 2/2012 | Boller | G06F 17/30902 709/203 |
| 2013/0204884 A1 | 8/2013 | Stewart | |
| 2014/0100922 A1* | 4/2014 | Aycock | G06Q 10/0639 705/7.38 |
| 2014/0129265 A1* | 5/2014 | Arena | G06Q 30/0201 705/5 |
| 2014/0334304 A1 | 11/2014 | Zang | |
| 2015/0082196 A1* | 3/2015 | Berger | G06Q 10/101 715/753 |
| 2015/0188973 A1* | 7/2015 | Kacmarcik | H04L 65/607 715/719 |
| 2016/0182309 A1* | 6/2016 | Maturana | G06F 17/5009 709/224 |
| 2016/0196532 A1* | 7/2016 | De | G06Q 10/103 705/7.15 |
| 2016/0359689 A1* | 12/2016 | Herreria | G06F 3/04847 |
| 2018/0173846 A1* | 6/2018 | Sigurjonsson | G06F 19/12 |

\* cited by examiner

SYSTEM AND METHOD FOR INTELLIGENTLY MAPPING A SOURCE ELEMENT TO A TARGET ELEMENT IN AN INTEGRATION CLOUD SERVICE DESIGN TIME

CLAIM OF PRIORITY

This application claims the benefit of priority to U.S. Provisional Application titled "SYSTEM AND METHOD FOR INTELLIGENTLY MAPPING A DRAGGED AND DROPPED SOURCE ITEM TO A TARGET ITEM", Application No. 62/171,769, filed Jun. 5, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud services, and are particularly related to a system and method for intelligently mapping a source element to a target element in a design time of a cloud-based integration service.

BACKGROUND

The rapid shift from on-premises applications to a hybrid mix of Software-as-a-Service (SaaS) and on-premises applications has introduced challenges for companies attempting to simplify enterprise application integration. Integration platform as a service (iPaaS) can provide a set of cloud-based tools to address these challenges. An iPaaS platform can provide a design time for developers to design integration flows, and to map data objects of different formats between source applications and target applications.

SUMMARY

In accordance with an embodiment, described herein is a system and method for creating advanced mappings between a source application and a target application in a design time of a cloud-based integration service. The web interface application in the design time can display a source data object including one or more source elements, a target data object including one or more target elements, and a plurality of mapping components. A mapping area for a particular target element can include a mapping expression between a source element and the particular target element. When a mapping component is dragged and dropped onto the mapping area, an application programming interface (API) defining one or more actions in accordance with a plurality of rules can be triggered, to generate one or more mapping statements to modify the mapping expression to create an advanced mapping between the source element and the target element.

DETAILED DESCRIPTION

Integration platform as a service, for example, Oracle Integration Cloud Service (ICS), can provide a cloud-based platform for building and deploying integrations flows that connect applications residing in the cloud or on-premises.

When creating an integration flow, mapping data between a source and target data objects can be time consuming, particularly when advanced mappings, for example, conditional constraints, are required between a source element and a target element.

In accordance with an embodiment, as used herein, a mapping can be an extensible stylesheet (XSL) expression indicating how an element/field from a source data object maps to one or more elements from a target data object. For example, a mapping from "city" from a source data object to "town" in a target data object can be expressed by "city: <xsl:value-of select='/ns0:shippingOrder/ns0:deliverTo/cmm:city'/>". An advanced mapping can represent a mapping that has been modified by one or more functions, operators, or statements, to include constraints, value calculations, or other operations.

For example, a source element "price" in a source data object may map to the sum of two prices in a target data object. A function or operator can be used to modify the mapping expression to create an advanced mapping by combing the two prices in the target data object, and mapping the combined price to the source price.

In accordance with an embodiment, described herein is a system and method for creating advanced mappings between a source application and a target application in an integration cloud service design time. A web interface application provided by the integration cloud service can display a source data object including one or more source elements, a target data object including one or more target elements, and a plurality of mapping components. A mapping area for a particular target element can include a mapping expression between a source element and the particular target element. When a mapping component is dragged and dropped onto the mapping area, an application programming interface defining one or more actions in accordance with a plurality of rules can be triggered, to generate one or more mapping statements to modify the mapping expression to create an advanced mapping between the source element and the target element.

Figure 1:
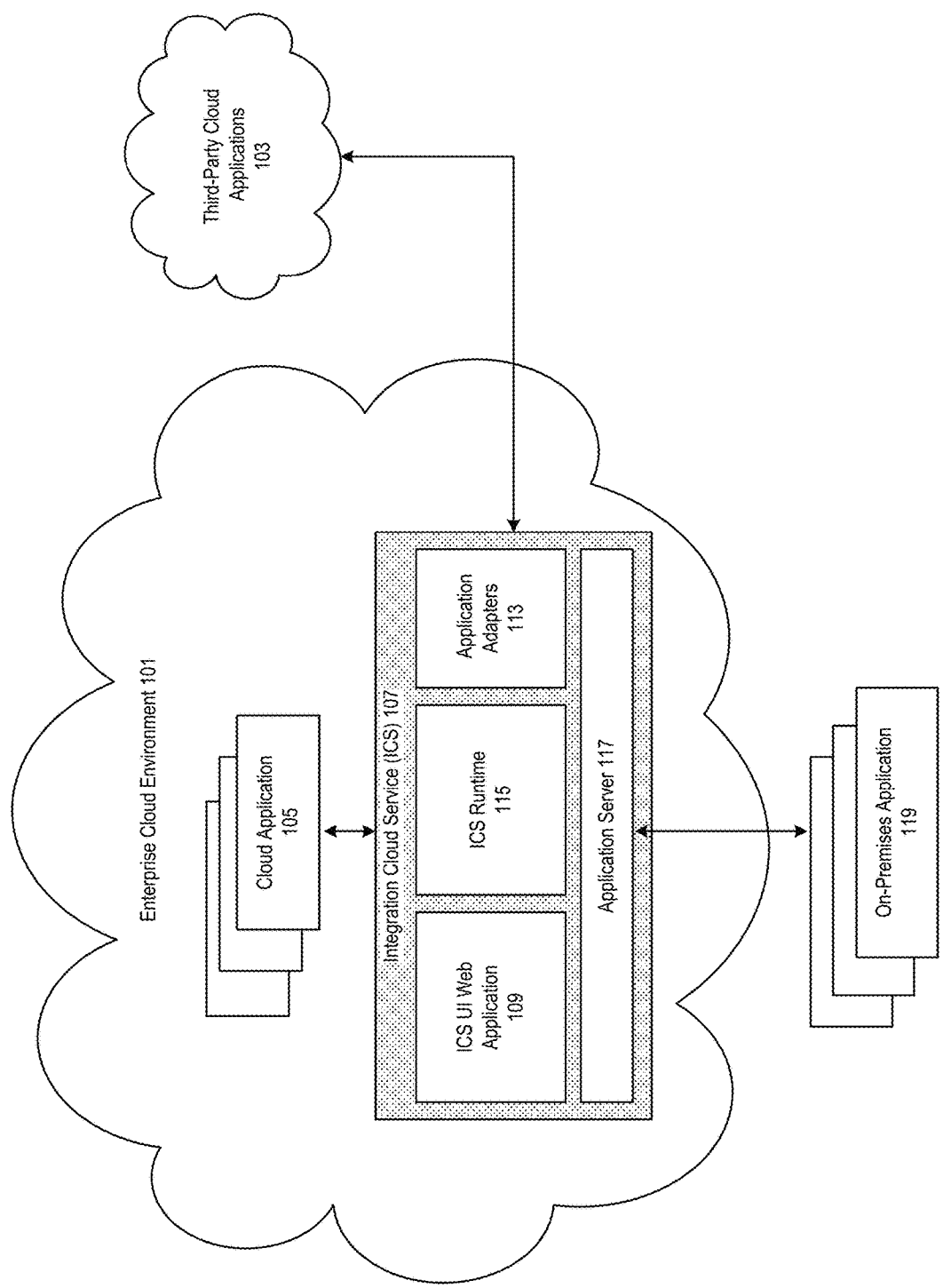
FIG. 1 illustrates an integration cloud service in accordance with an embodiment.

FIG. 1 illustrates an integration cloud service in accordance with an embodiment.

As shown in FIG. 1, an ICS 107 can provide a cloud-based integration service for designing, executing, and managing ICS integration flows. The ICS can include a web application 109 and an ICS runtime 115 executing on an application server 117 in an enterprise cloud environment (for example, Oracle Public Cloud) 101. The web application can provide a design time that exposes a plurality of user interfaces for a developer to design, activate, manage, and monitor an ICS integration flow. An activated ICS integration flow can be deployed and executed on the ICS runtime.

In accordance with an embodiment, a plurality of application adapters 113 can be provided to simplify the task of configuring connections to a plurality of applications, by handling the underlying complexities of connecting to those applications. The applications can include enterprise cloud applications of the ICS vendor (for example, Oracle Right-Now) 105, third-party cloud applications (for example, Salesforce) 103, and on-premises applications 119. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime.

Figure 2:
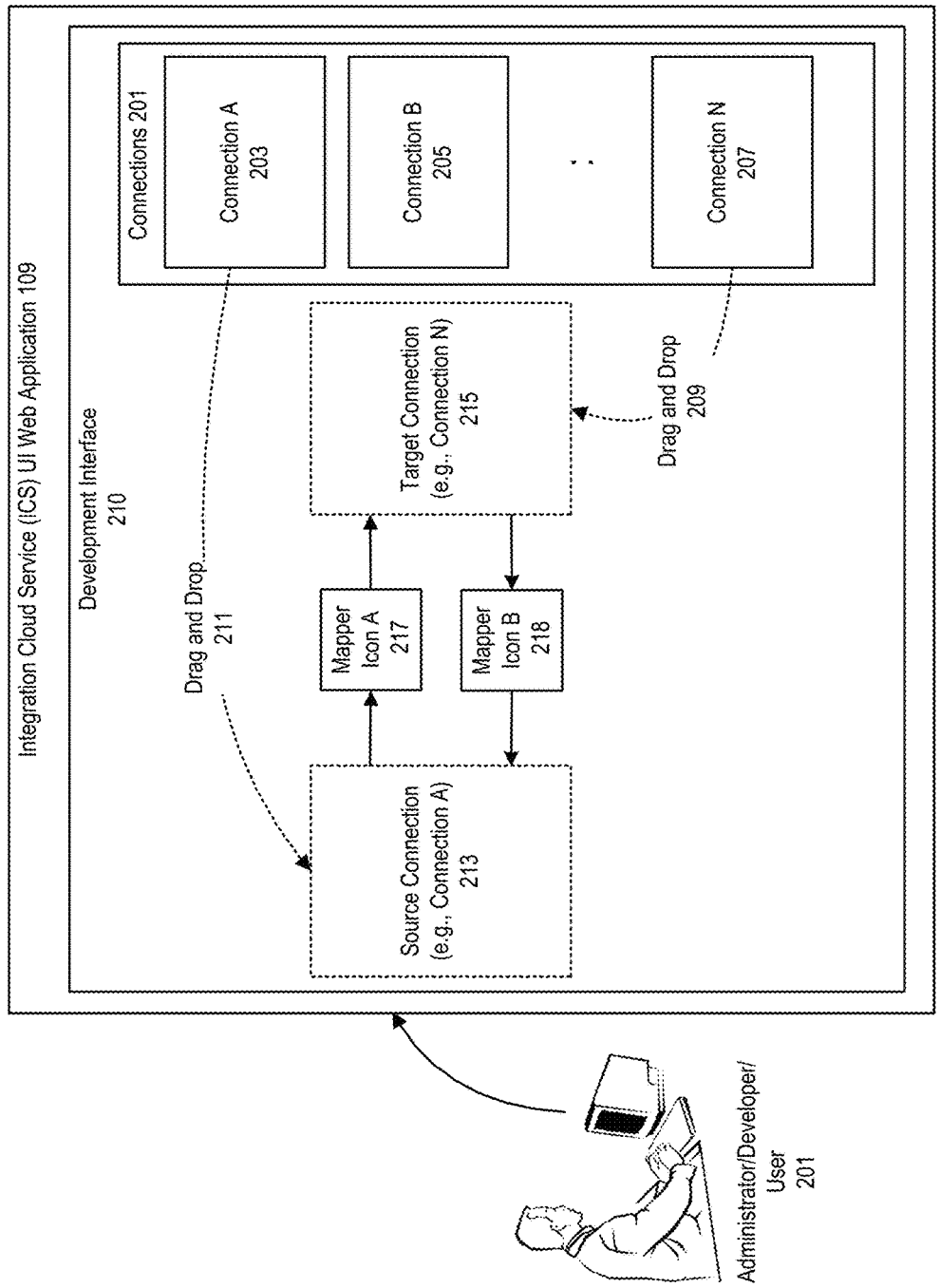
FIG. 2 illustrates an ICS design time, in accordance with an embodiment.

FIG. 2 illustrates an ICS design time, in accordance with an embodiment.

In accordance with an embodiment, a development interface (e.g., a development canvas) 210 in the web UI application can be used by a developer to create an ICS integration flow, using a plurality of existing connections 201, for example, connection A 203, connection B 205 and connection N 207.

As shown in FIG. 2, a particular connection (for example, connection A) can be dragged and dropped 211 to the development interface as a source connection 213, and connection N can be dragged and dropped 209 to the development interface as a target connection 215. The source connection can include information required to connect to a source application, and can be used by the ICS to receive requests from the source application (for example, an Oracle RightNow cloud application). The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 217 and mapper icon B 218) can be displayed for use in opening the mappers, so that the developer can define how information is transferred between a source and target data objects for both the request and response messages.

In accordance with an embodiment, the mappers can provide a graphical user interface for the developer to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. A lookup can associate values used by one application for a specific field to the values used by other applications for the same field. This provides the capability to map values across vocabularies or systems.

Intelligent Drag and Drop

As described above, a recommended mapping provided by the recommendation engine can be converted into an actual mapping. An actual mapping can be represented by a mapping expression, for example, an XML path language (XPath) expression, between a source element and a target element.

In accordance with an embodiment, the actual mapping can be further configured to create an advanced mapping, which can include conditional statements, XPath functions, and reference lookups.

For example, an XPath function "concatQ" can be used to modify a mapping expression, by concatenating two elements in a target data object together to match one element in a source data object.

In accordance with an embodiment, the system can automatically generate mapping expressions and statements using an intelligent drop API, to create advanced mappings between the source and target elements. The intelligent drop API can take appropriate actions, based on a dragged and dropped source item and a catching target item, and where the source item is dropped, from example, above or below the catching target item. The intelligent drop API can be invoked when a source item is dragged and dropped onto a target item, or when a user selects the source item and the target item, and then clicks on a map button.

The automatic injection of mapping expressions and mapping statements can increase efficiency and reduce errors in data mapping in an ICS integration flow.

In accordance with an embodiment, a source item and a target item can be any component that can be used to create a mapping between a source element and a target element. The source item can be an element, a field, or an attribute in a source data object; or one of a plurality of hierarchically classified mapping components, including extensible stylesheet language (XSL) constructs, XPath functions, operations, and variables. A target item can be a target element, or a component automatically inserted or generated by the dropping of a source item.

In accordance with an embodiment, the intelligent drop API can define a set of mapping rules that dictate one or more actions to be taken when a user drops a source item onto a target item. Each mapping rule can define an action for a combination of the dropped source item and the catching target item.

In accordance with an embodiment, the one or more actions can include automatically injecting a mapping expression to create a mapping between a source element and a target element, when no mapping exists between the two elements. If a mapping expression has already existed, one or more additional source items can be dragged and dropped onto the mapping expression, to place constraints and conditions, and to trigger operations on the mapping expression or a related item thereof. The additional source items can also prompt a user to browse for lookups by types of source and target applications, and automatically provide default parameters to a selected lookup function.

In accordance with an embodiment, when a mapping rule is not available at a level of the source and target item, a rule for a higher classification of mapping components can be used to trigger an action for the dropped source item and the catching target item. When a source item is dragged and dropped onto a target item where a desired action cannot be performed, an error message can be generated to alert the user.

Figure 3:
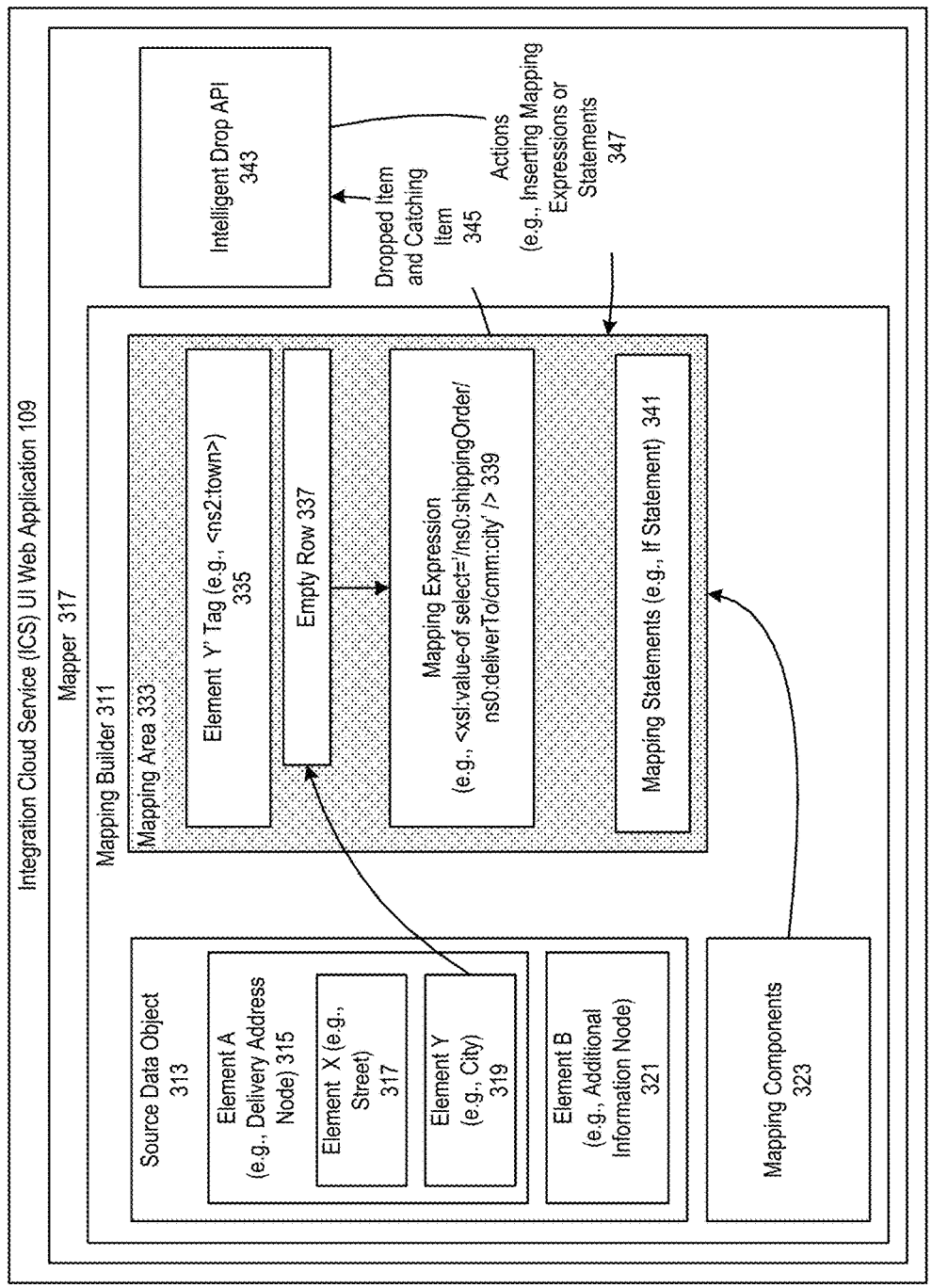
FIG. 3 illustrates a system for intelligently mapping a source element to a target element in an ICS design time, in accordance with an embodiment.

FIG. 3 illustrates a system for intelligently mapping a source element to a target element in an ICS design time, in accordance with an embodiment.

As shown in FIG. 3, the system can include a mapping builder 311 for use in creating an advanced mapping between a source element and a target element. The mapping builder can be invoked when an ICS developer clicks on a target element in a target data object, or on an actual mapping, for example, on the solid line or on the target element of the actual mapping. For example, the mapping builder as shown in FIG. 3 is invoked by clicking on "element Y" in the target data object.

In accordance with an embodiment, the invoked mapping builder can include a source data object 313 that is loaded when the mapper is opened. The source data object can include a plurality of elements, for example, element A 1115, element B 321, element X 317 and element Y 319. The mapping builder can further include a plurality of mapping components 323, and a mapping area 333.

As further shown in FIG. 3, the mapping area can include a tag (for example, <ns2:town>) for the target element, and an empty row 337 that indicates no mapping exists for the target element.

In accordance with an embodiment, when an ICS developer drags and drops element Y onto the empty row, the mapping builder can invoke 345 an intelligent API 343 by passing the dropped item and the catching item as parameters. The intelligent drop API can generate 347 a mapping expression 339 based on a combination of the dropped item and the catching item, to replace the empty row. The mapping expression can be an XPath expression that defines a mapping between the source element and the target element.

In accordance with an embodiment, one or more of the plurality of mapping components can be dragged and dropped on the mapping expression, or another item in the mapping area, to trigger the intelligent drop API to generate one or more mapping statements 341. A mapping statement can place a constraint or condition, trigger operations on the mapping expression or a related item thereof, or prompt a user to browse for lookups based on types of the source and target applications Actions/Outcomes Listing 1 illustrates an exemplary mapping expression in accordance with an embodiment.

```
<xsl:value-of select='/ns0:shippingOrder/ns0:de-
    liverTo/cmm:city'/>
```

Listing 1

As shown in Listing 1, the mapping expression can include a mapping component "value-of" from one of the plurality of mapping components. The mapping component can be used to extract the value of a selected XML node, and add the extracted value to the target element, thereby creating a mapping between the source and target elements.

In accordance with an embodiment, as described above, the mapping expression can be created when a user drags and drops a source element onto a target element, or when the user selects the source element and the target element, and clicks on a map button.

However, in accordance with an embodiment, if the source element and the target element are both repeating elements, a mapping expression can be created with a <xsl:for-each> statement as the parent of the target element, The "select" attribute of the <xsl:for-each> statement can be the location path to the source element.

In accordance with an embodiment, when a mapping component representing a condition (for example, <xsl:if>) is dragged and drop onto the mapping expression or another item related to the target element, an empty parent row and the condition can be automatically inserted above the mapping expression, wherein the empty parent row provides an interface for a user to specify a value (for example, true or false) for the condition. The mapping builder can use the specified value and the condition to generate a parent row defining a complete condition for the mapping expression.

In accordance with an embodiment, when a mapping component representing a function is dragged and dropped on the mapping expression, the dropped function can automatically be wrapped around the mapping expression. If the function has multiple parameters, a user can be prompted to select a particular parameter that can take the mapping expression as its value.

For example, if the dropped mapping component is a concatenating function, dropping the function on the mapping expression can be used by the system to prompt the user to select a particular parameter to copy the mapping expression to. Once selected, the user can drag and drop another item onto the other parameter that is not selected, so that the dropped item can be concatenated with the mapping expression to create a concatenated string.

In accordance with an embodiment, when a lookup function is dragged and dropped on the mapping expression, a user can be prompted to browse for lookups by the types of applications related to the source and target elements. When a lookup is selected, the parameters of the lookup function can be defaulted to the applications related to the source and target elements.

In accordance with an embodiment, other use cases can be supported by the mapping builder. For example, when a source date element is dropped onto a target date element, a time zone offset function can be automatically injected to create a mapping expression.

In accordance with an embodiment, Table 1 illustrates exemplary actions or outcomes generated from dropping a dragged function or operator onto a catching target item.

TABLE 1

| Types of Items Catching The Dropped Function or Operator | State of The Caching Item | Actions/Outcomes |
|---|---|---|
| Any XPath expression, including location path, XPath function, operation, parameter, operand | Editing | If the dropped function or operator has 1 parameter/operand, the catching XPath expression becomes the parameter or operand. If the dropped function or operator has 2 or more parameters/operands, a user is prompted to select which parameter or operand to copy the catching XPath expression to. If the dropped function does not require a parameter or operand, the catching XPath expression can be fully replaced by the dropped function, or operator. |
| Attribute of an XSL statement | Editing | Invalid user action: An error pops up. |
| XSL statement | Editing or Not Editing | Same as when the catching element is any XPath expression described above. |
| Target tag | N/A | <xsl:value-of> is auto inserted. The dropped function or operator becomes the value of the "select" attribute. |
| Empty child row of an editing XSL statement | Empty | Invalid user action: an error pops up. |
| Empty child row of a target tag or an non-editing XSL statement | Empty | <xsl:value-of> is auto inserted. The dropped function or operator becomes the value of the "select" attribute. |

As shown in Table 1, the actions or outcomes resulted from the dropping of a dragged function or operator on a catching target item include an error message, and partial or full replacement of a catching element by the dropping function or operator.

In accordance with an embodiment, Tables 2 and 3 illustrate exemplary actions or outcomes generated from dropping a dragged flow control statement onto a catching target item.

TABLE 2

| Types of Items Catching The Dropped Flow Control Statement | State of The Caching Item | Actions/Outcomes |
|---|---|---|
| Target tag | N/A | See Table 3 below. |
| XSL statement | Not Editing | xsl:choose is inserted as a parent row of a target tag of the catching XSL statement. |
| XSL statement | Editing | Invalid user action: an error pops up |
| xsl:when, xsl:otherwise, or attribute-value template | N/A | Invalid user action: An error pops up. |
| Any XPath expression statement | Editing | Invalid user action: an error pops up. |
| Attribute of an XSL statement | Editing | Invalid user action: an error pops up. |

TABLE 3

| Flow Control Statement Dragged and Dropped | Catching Item | Actions/Outcomes |
|---|---|---|
| xsl:if | Target tag | The xsl:if is inserted as a parent row of the target tag. |
| xsl:choose | Target tag | Invalid user action: Error pops up, since a user would not have a way to create the target tag under a xsl:otherwise or a 2$^{nd}$ xsl:when. |

TABLE 3-continued

| Flow Control Statement Dragged and Dropped | Catching Item | Actions/Outcomes |
|---|---|---|
| xsl: for-each | Target tag | The xsl:for-each is inserted as a parent row of the target tag. |

As shown in Tables 2 and 3, when a user drops an XSL flow control statement, for example, "xsl:if", "xsl:choose", or "xsl:for-each", onto a target tag or XSL statement, the mapping builder can insert the XSL flow control statement as a parent row of the target tag or XSL statement. Dropping the XSL flow control statement onto other types of target items can generate an error.

Intelligent Drop API

Figure 4:
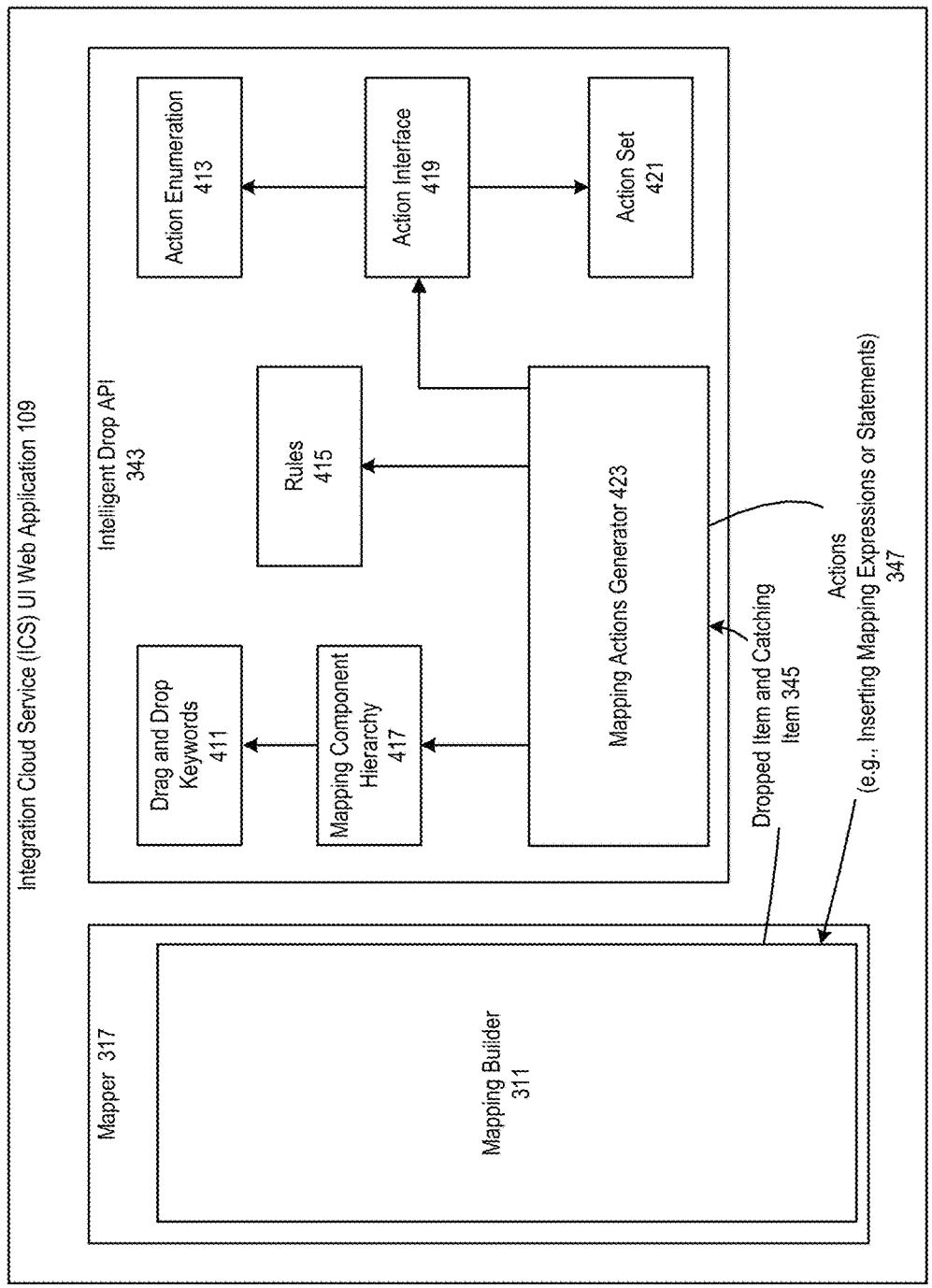
FIG. 4 illustrates an intelligent drop API in accordance with an embodiment.

FIG. 4 illustrates an intelligent drop API in accordance with an embodiment.

As shown in FIG. 4, the intelligent drop API can include a plurality of classes or interfaces. The classes or interfaces can be instantiated into objects at runtime to generate mapping expressions or mapping statements, for the mapping builder to create advanced mappings. The objects can include a rules object 315, an action interface 419, an action enumeration object 413, an action set object 421, and a drop and drop keywords (DDKeywords) object 411, a mapping component hierarchy object 417, and a mapping actions generator object 423

In accordance with an embodiment, the rules object can define a set of rules, each rule specifying one or more actions to be taken when a source item is dropped onto a target item. The action interface object can include a run( ) method for executing different actions and rules, each action comprising a step or a series of steps for accomplishing a particular intelligent drop functionality. The available steps for use in constructing each action can be defined by the action enumeration object.

As an illustrative example, one of the available steps is a step of inserting an empty parent row or child row to a mapping expression.

In accordance with an embodiment, the action set object can define a series of actions to be executed sequentially to accomplish a goal, wherein the result of a first action can be passed as the catching item of the next action. The mapping component hierarchy object can define a hierarchical categorization/classification of the mapping components described above. The DDKwords object can provide keywords (for example, STATEMENT, FLOW_CONTROL, EXPRESSION, and FUNCTION) for classifications/categories of the mapping components.

For example, the DDKwords object can use the "FUNCTION" keyword to "concat( )" as a function, which is as part of the category of "EXPRESSION".

At runtime, the mapping actions generator object can load the rules defined in the rules object, actions defined in the action enumeration object, and the hierarchical categories of mapping components defined in the mapping component hierarchy object. Based on the dropped item and catching item that are passed as parameters, the mapping actions generator object can examine the rules object, to determine an applicable rule for use in invoking one or more actions.

In accordance with an embodiment, in determining an applicable rule, the mapping actions generator object can compare the dropped item and the catching item against each rule. If a particular rule being evaluated is not applicable to the particular pair of dropped and catching items, a rule applicable for a pair of dropped and catching item at a higher classification can be used.

For example, if the catching item (catcher) is "<xsl:value-of>", the dropped item (draggable item) is "concat( )", a rule for "STATEMENT" (catcher) and "FUNCTION" (draggable item) can be used, since the catching item "<xsl:value-of>" is a statement, and the dropped item "concat( )" is a function.

Figure 5A:
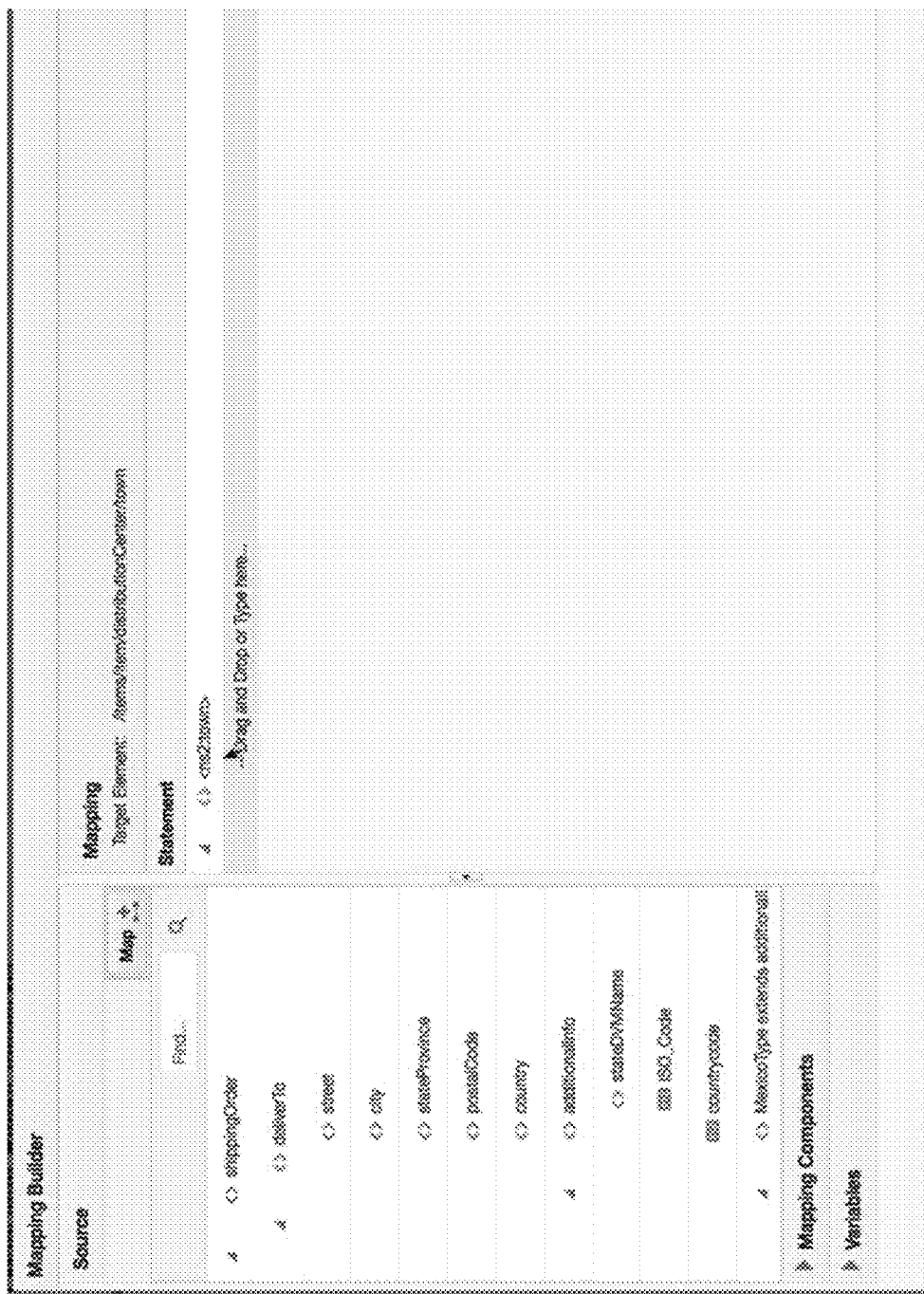
FIGS. 5A-5B illustrate an automatic injection of a mapping expression between a dropped item and a catching item in an ICS design time, in accordance with an embodiment.
Figure 5B:
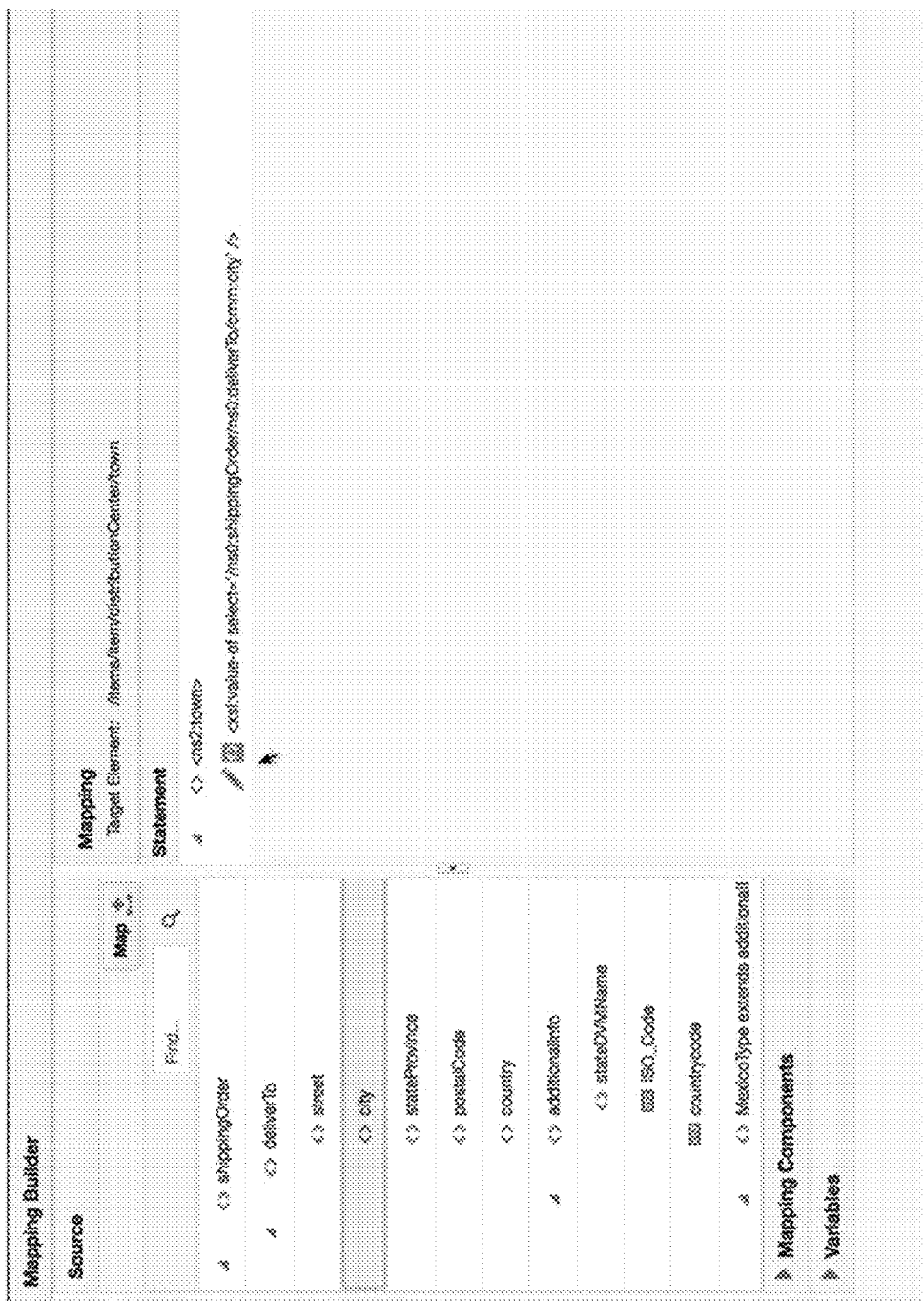

FIGS. 5A-5B illustrate an automatic injection of a mapping expression between a dropped item and a catching item in an ICS design time, in accordance with an embodiment.

As shown in FIG. 13A, the mapping builder is invoked when a user clicks on a target element (for example, town). Since no mapping exists for the target element, the mapping builder automatically inserts an empty child row, as indicated by "Drag and Drop or Type here", for the target element.

In FIG. 5B, when a user or ICS developer drags and drops a source item (for example, city) onto the target item (i.e. the empty child row), a mapping expression can be automatically generated to replace the empty child row.

Figure 6A:
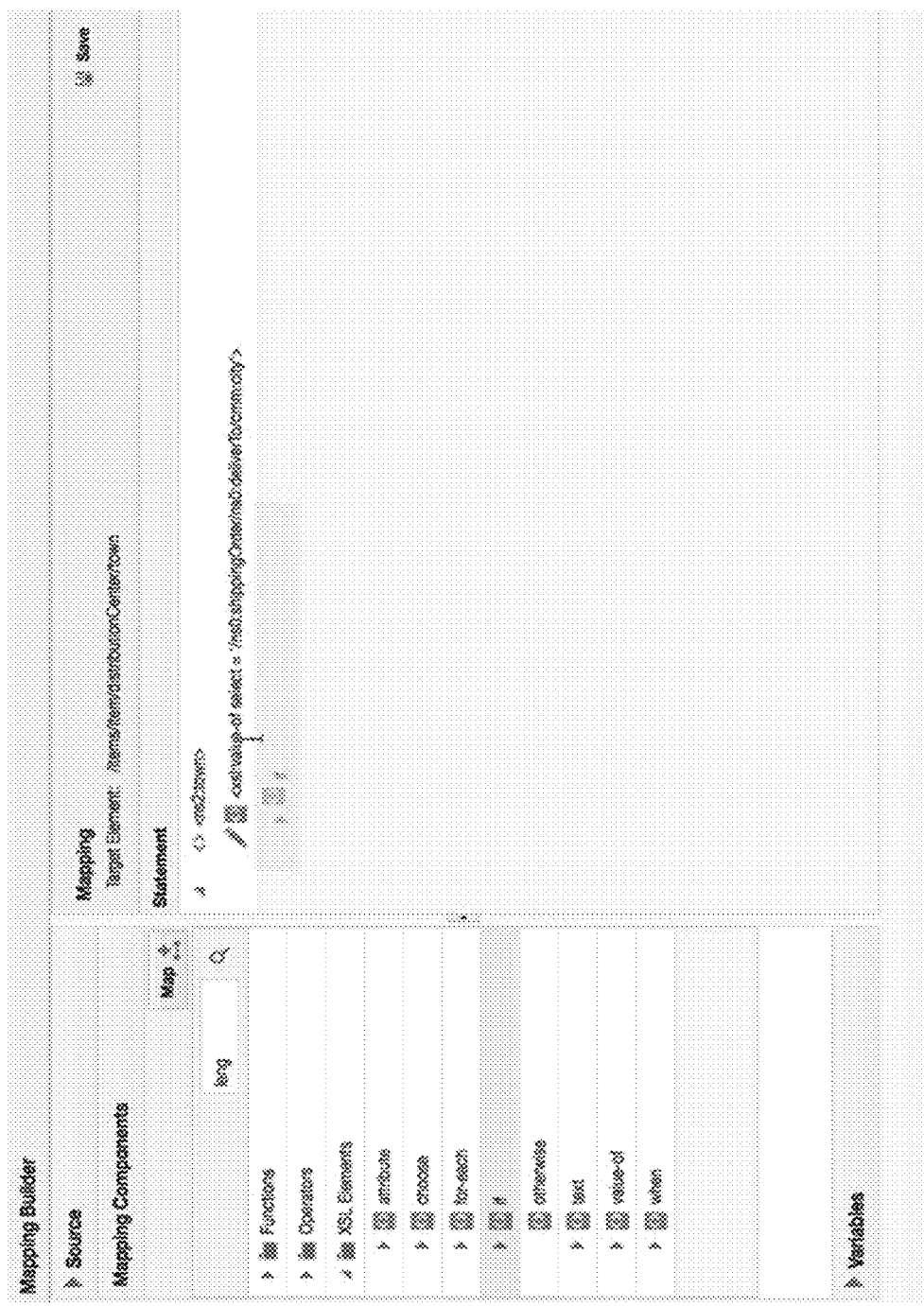
FIGS. 6A-6C illustrate actions taken by a mapping builder when a function is dragged and dropped onto a mapping expression, in accordance with an embodiment.
Figure 6B:
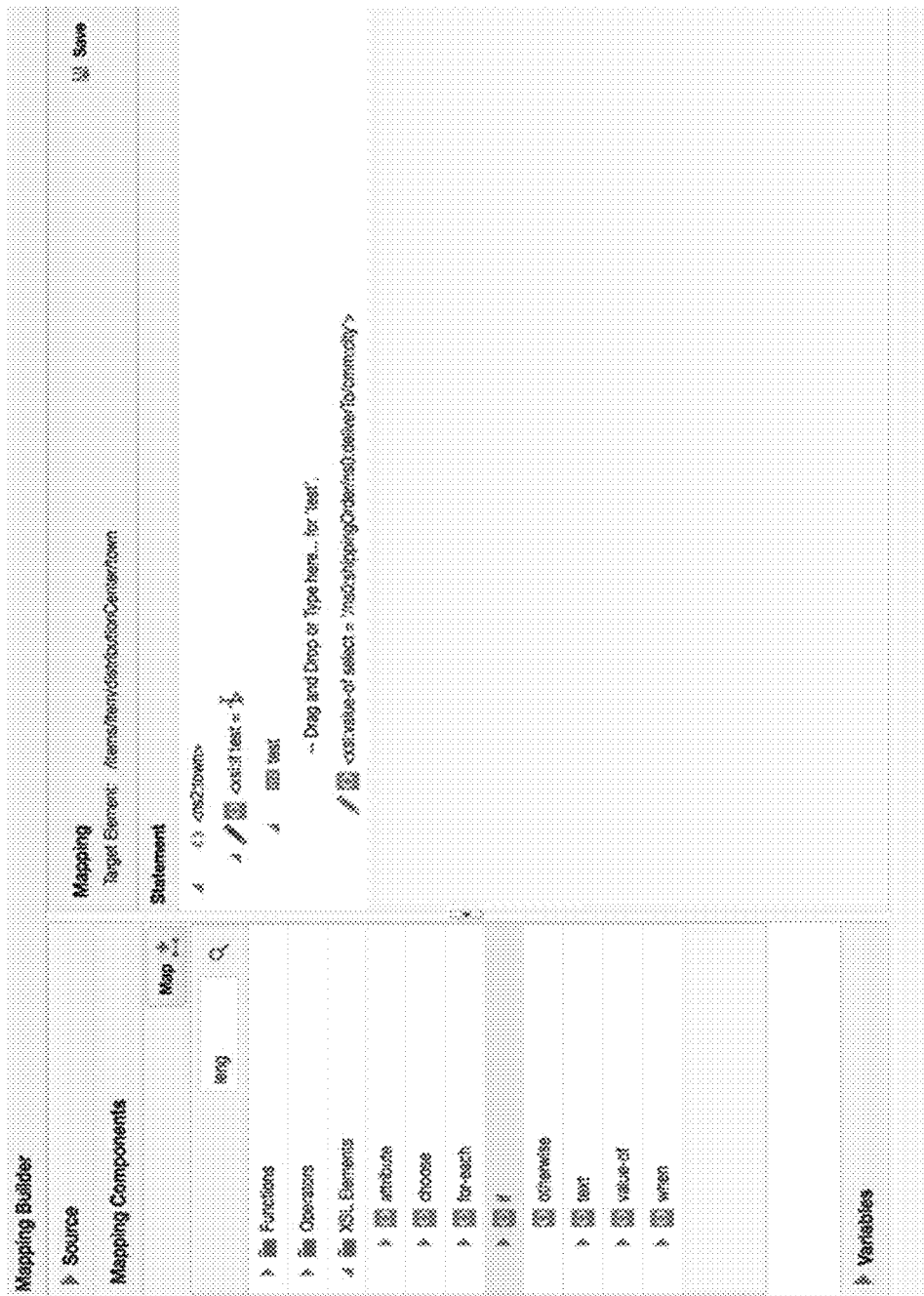
Figure 6C:
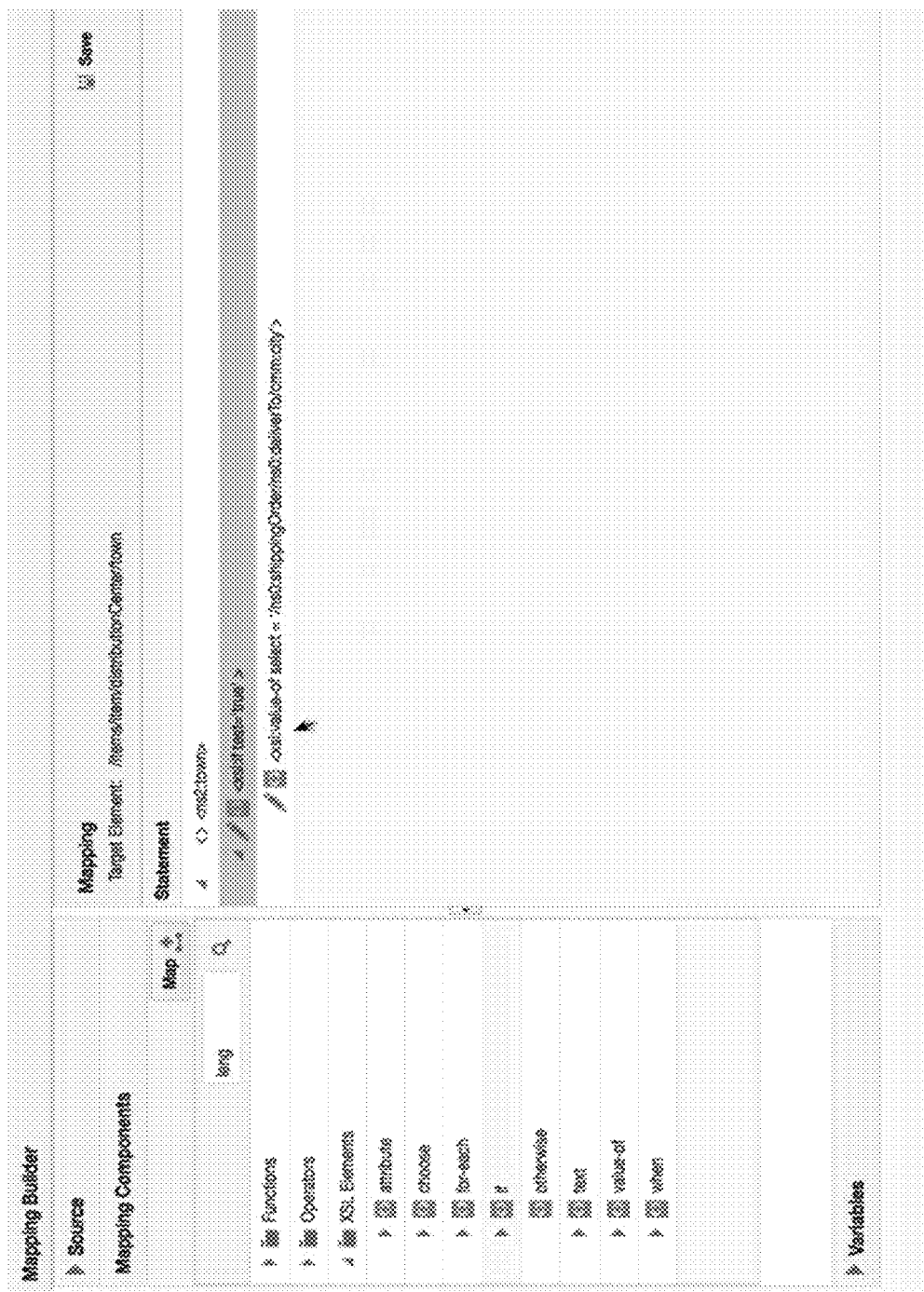

FIGS. 6A-6C illustrate actions taken by a mapping builder when a function is dragged and dropped onto a mapping expression, in accordance with an embodiment.

FIG. 6A shows that an "if" function being dragged and dropped on a mapping expression. FIG. 6B shows that dropping the "if" function on the mapping expression generates a conditional statement, and an empty row that allows a user to specify a value for the conditional statement. FIG. 6C shows that after a value is specified for the conditional statement, a mapping statement that places a condition for the mapping expression can be created.

Figure 7A:
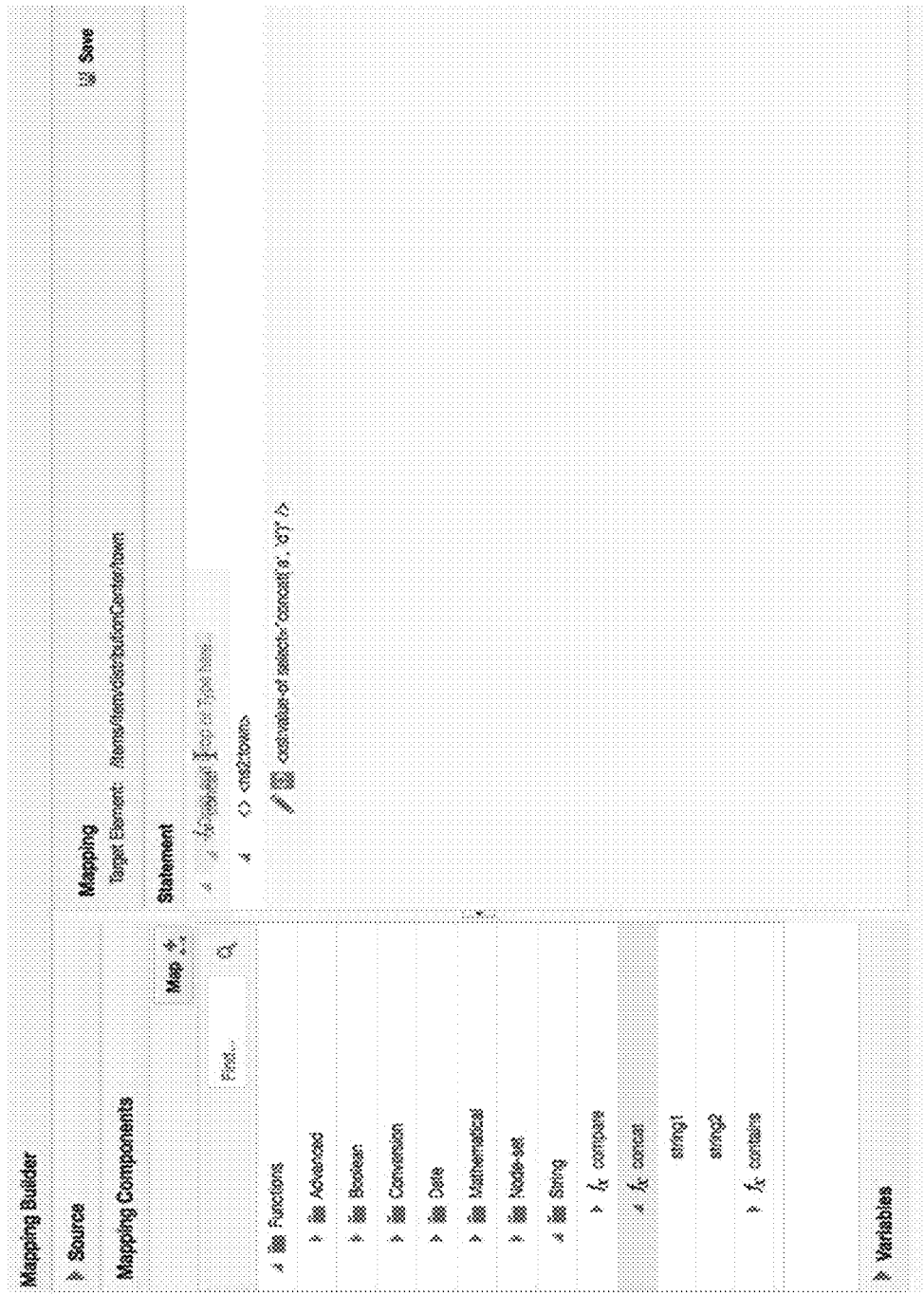
FIGS. 7A-7B illustrate that the mapping builder can generate an error when a source item is dragged and dropped inappropriately, in accordance with an embodiment.
Figure 7B:
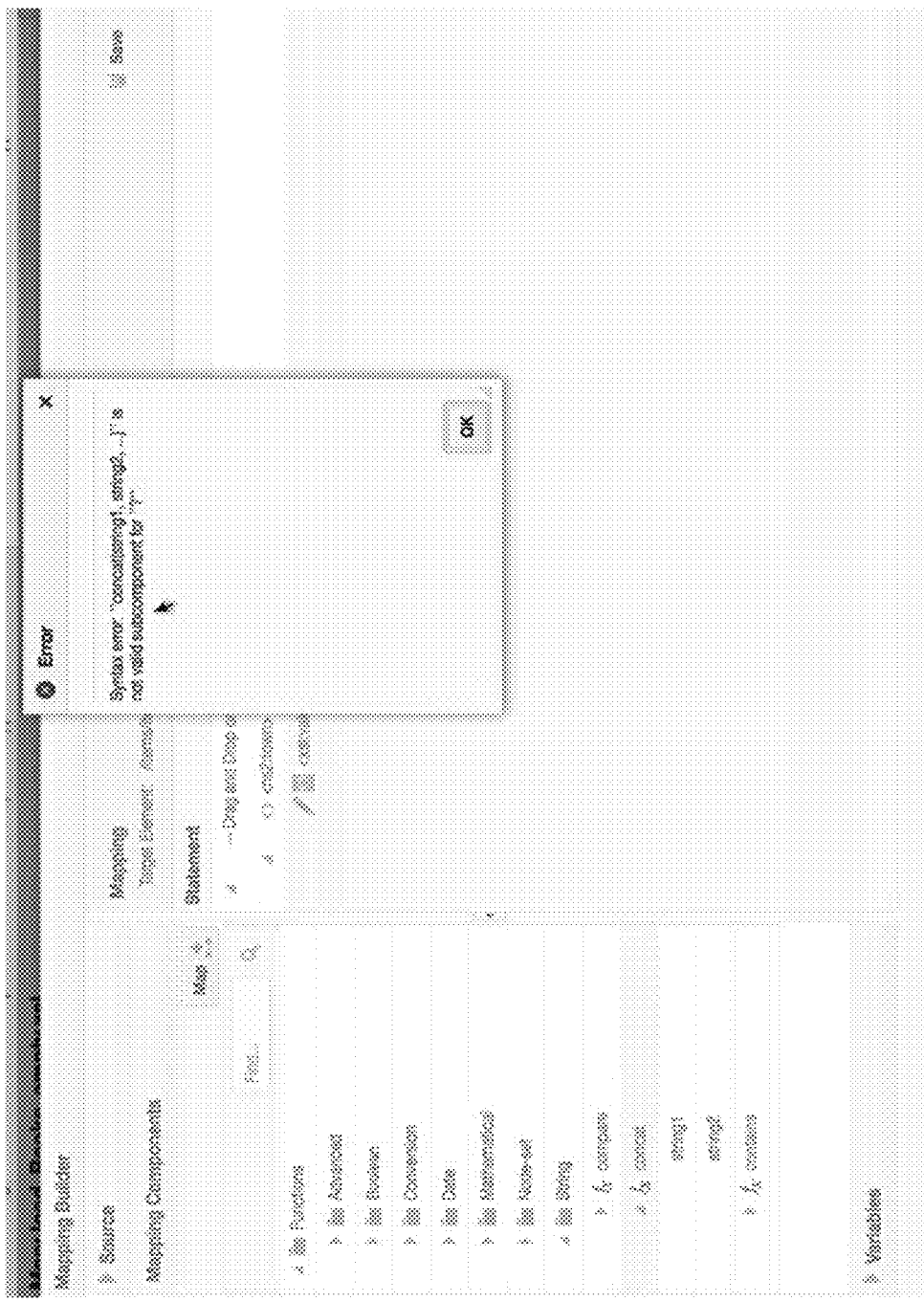

FIGS. 7A-7B illustrate that the mapping builder can generate an error when a source item is dragged and dropped inappropriately, in accordance with an embodiment.

FIG. 7A shows that a "concatQ" function is being dragged and dropped onto an empty parent row of a target element tag (for example, <ns2:town). Since the mapping builder does not know where to assign the value produced by the "concat( )" function, an error can be generated to alert a user that the dragging and dropping operation is invalid, as shown in FIG. 15B.

Figure 8:
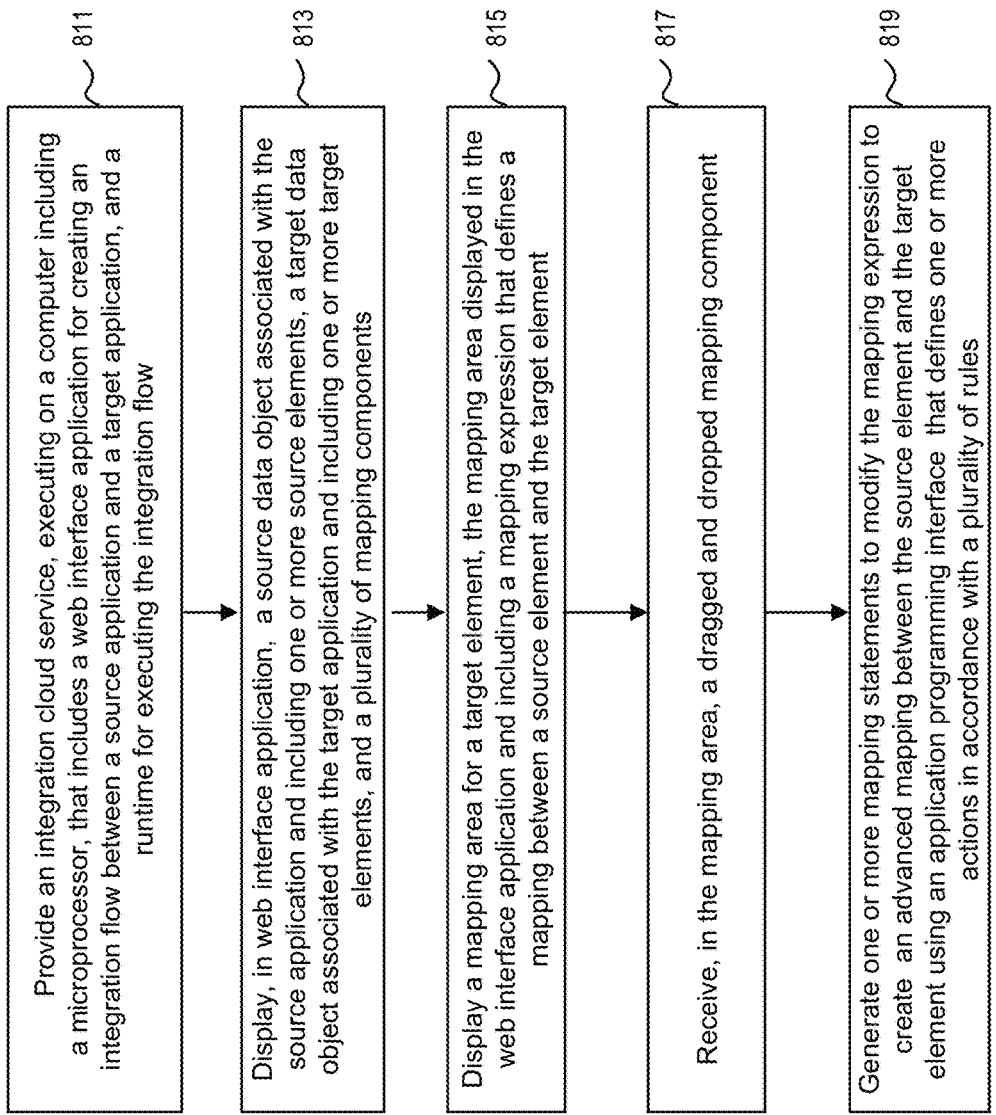
FIG. 8 illustrates a method for intelligently mapping a source element to a target element in an ICS design time, in accordance with an embodiment.

FIG. 8 illustrates a method for intelligently mapping a source element to a target element in an ICS design time, in accordance with an embodiment.

As shown in the figure, at step 811, an integration cloud service is provided executing on a computer including a microprocessor, wherein the integration cloud service includes a web interface application for creating an integration flow between a source application and a target application, and a runtime for executing the integration flow.

At step 813, the web interface application is configured to display a source data object associated with the source application and including one or more source elements, a target data object associated with the target application and including one or more target elements, and a plurality of mapping components.

At step 815, a mapping area for a target element is displayed in the web interface application, the mapping area including a mapping expression that defines a mapping between a source element and the target element.

At step 817, the mapping area receives a dragged and dropped mapping component.

At step 819, one or more mapping statements are generated to modify the mapping between the source element and the target element using an application programming interface (API) that defines one or more actions in accordance with a plurality of rules.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for modifying a mapping expression in a cloud-based integration service to create an advanced mapping in the cloud-based integration service, the system comprising:

a computer comprising one or more microprocessors;

a cloud service, executing on the computer, wherein the cloud service comprises a web interface application for creating an integration flow between a source application and a target application, and a runtime for executing the integration flow;

a mapping area displayed in the web interface application for a target element of the target application, wherein the mapping area comprises a plurality of target items, the plurality of target items comprising a mapping expression that defines a mapping between a source element of the source application and the target element of the target application;

a plurality of mapping components displayed in the web interface application, wherein each mapping component is configured to be dragged and dropped onto one or more of the plurality of target items, wherein a first mapping component represents one or more of a condition for modifying the mapping expression and/or a function for modifying the mapping expression; and an application programming interface that defines a plurality of rules, wherein each rule specifies one or more actions for a combination of a dragged and dropped mapping component and a catching target item catching the dragged and dropped mapping component, wherein the first mapping component is dragged and dropped onto the mapping expression in the mapping area to trigger the application programming interface to apply one or more of the plurality of rules to automatically generate one or more mapping statements, the one or more mapping statements modifying the mapping expression by one or more of: wrapping a function around the mapping expression and/or adding a reference lookup to the mapping expression to create an advanced mapping between the source element and the target element, wherein the advanced mapping is deployed and executed by the cloud service as the integration flow between the source application and the target application on the runtime.

2. The system of claim 1, wherein the one or more mapping statements modify the mapping expression by one or more of: adding a conditional statement to the mapping expression, and/or modifying the mapping expression by one or more functions, operators, or statements, to include constraints, value calculations, or other operations.

3. The system of claim 1, wherein the plurality of mapping components comprise one or more of extensible stylesheet language (XSL) constructs, XPath functions, operations, and variables.

4. The system of claim 1, wherein the application programming interface is configured to have the first mapping component and the mapping expression as the catching target item passed as parameters to an object in the application programming interface.

5. The system of claim 1, wherein the mapping area is selectively displayed when the target element is clicked on.

6. The system of claim 1, wherein the plurality of mapping components are loaded into an object in the application programming interface, and wherein the plurality of mapping components are hierarchically classified in the application programming interface.

7. The system of claim 1, wherein the plurality of mapping components displayed in the web interface application comprise a source item, wherein the first source item is dragged and dropped onto the mapping expression in the mapping area to trigger the application programming interface to apply a rule to generate a user prompt to prompt an associated user of the system to browse for a lookup comprising a reusable mapping for different codes and terms used by used by the source application for a specific field and by the target application for the same field thereby providing a capability to map values across vocabularies or systems.

8. A method for modifying a mapping expression in a cloud-based integration service to create an advanced mapping in the cloud-based integration service, the method comprising:

providing a cloud service, executing on a computer comprising a microprocessor, wherein the cloud service comprises a web interface application for creating an integration flow between a source application and a target application, and a runtime for executing the integration flow;

displaying, in the web interface application, a mapping area for a target element of the target application, wherein the mapping area comprises a plurality of target items, the plurality of target items comprising a mapping expression that defines a mapping between a source element of the source application and the target element of the target application;

displaying, in the web interface application, a plurality of mapping components, wherein each mapping component is configured to be dragged and dropped onto one or more the plurality of target items, wherein a first mapping component represents one or more of a condition for modifying the mapping expression and/or a function for modifying the mapping expression;

providing an application programming interface that defines a plurality of rules, wherein each rule specifies one or more actions for a combination of a dragged and dropped mapping component and a catching target item catching the dragged and dropped mapping component;

receiving, in the mapping area, the first mapping component dragged and dropped onto the mapping expression; and triggering the application programming interface to apply one or more rules of the plurality of rules to automatically generate one or more mapping statements, the one or more mapping statements modifying the mapping expression by one or more of: wrapping a function around the mapping expression and/or adding a reference lookup to the mapping expression to create an advanced mapping between the source element and the target element, wherein the advanced mapping is deployed and executed by the cloud service as the integration flow between the source application and the target application on the runtime.

9. The method of claim 8, wherein the one or more mapping statements modify the mapping expression by one or more of: adding a conditional statement to the mapping expression, and/or modifying the mapping expression by one or more functions, operators, or statements, to include constraints, value calculations, or other operations.

10. The method of claim 8, wherein the plurality of mapping components comprise one or more of extensible stylesheet language (XSL) constructs, XPath functions, operations, and variables.

11. The method of claim 8, wherein the application programming interface is configured to have the first mapping component and the mapping expression as the catching target item passed as parameters to an object in the application programming interface.

12. The method of claim 8, wherein the mapping area is selectively displayed when the target element is clicked on.

13. The method of claim 8, wherein the plurality of mapping components are loaded into an object in the application programming interface, and wherein the plurality of mapping components are hierarchically classified in the application programming interface.

14. The method of claim 8, wherein the plurality of mapping components displayed in the web interface application comprise a source item, wherein the first source item is dragged and dropped onto the mapping expression in the mapping area to trigger the application programming interface to apply a rule to generate a user prompt to prompt an associated user of the system to browse for a lookup comprising a reusable mapping for different codes and terms used by used by the source application for a specific field and by the target application for the same field thereby providing a capability to map values across vocabularies or systems.

15. A non-transitory computer-readable storage medium storing a set of instructions for modifying a mapping expression in a cloud-based integration service to create an advanced mapping in the cloud-based integration service design time, said instructions, when executed by one or more processors, causing the one or more processors to perform steps comprising:
   providing a cloud service, executing on a computer comprising a microprocessor, wherein the cloud service comprises a web interface application for creating an integration flow between a source application and a target application, and a runtime for executing the integration flow;
   displaying, in the web interface application, a mapping area for a target element of the target application, wherein the mapping area comprises a plurality of target items, the plurality of target items comprising a mapping expression that defines a mapping between a source element of the source application and the target element of the target application;
   displaying, in the web interface application, a plurality of mapping components, wherein each mapping component is configured to be dragged and dropped onto one or more the plurality of target items, wherein a first mapping component represents one or more of a condition for modifying the mapping expression and/or a function for modifying the mapping expression;
   providing an application programming interface that defines a plurality of rules, wherein each rule specifies one or more actions for a combination of a dragged and dropped mapping component and a catching target item catching the dragged and dropped mapping component;
   receiving, in the mapping area, the first mapping component dragged and dropped onto the mapping expression; and
   triggering the application programming interface to apply one or more rules of the plurality of rules to automatically generate one or more mapping statements, the one or more mapping statements modifying the mapping expression by one or more of: wrapping a function around the mapping expression and/or adding a reference lookup to the mapping expression to create an advanced mapping between the source element and the target element,
   wherein the advanced mapping is deployed and executed by the cloud service as the integration flow between the source application and the target application on the runtime.

16. The non-transitory computer-readable storage medium storing of claim 15, wherein the one or more mapping statements modify the mapping by one or more of: adding a conditional statement to the mapping expression, and/or modifying the mapping expression by one or more functions, operators, or statements, to include constraints, value calculations, or other operations.

17. The non-transitory computer-readable storage medium storing of claim 15, wherein the plurality of mapping components comprise one or more of extensible stylesheet language (XSL) constructs, XPath functions, operations, and variables.

18. The non-transitory computer-readable storage medium storing of claim 15 wherein the application programming interface is configured to have the first mapping component and the mapping expression as the catching target item passed as parameters to an object in the application programming interface.

19. The non-transitory computer-readable storage medium storing of claim 15, wherein the mapping area is selectively displayed when the target element is clicked on.

20. The non-transitory computer-readable storage medium storing of claim 15, wherein the plurality of mapping components are loaded into an object in the application programming interface, and wherein the plurality of mapping components are hierarchically classified in the application programming interface.

* * * * *

UNITED STATES PATENT AND TRADEMARK OFFICE
CERTIFICATE OF CORRECTION

PATENT NO. : 10,374,905 B2
APPLICATION NO. : 15/171894
DATED : August 6, 2019
INVENTOR(S) : Herreria et al.

It is certified that error appears in the above-identified patent and that said Letters Patent is hereby corrected as shown below:

In the Specification

In Column 5, Line 61, delete "applications" and insert -- applications. --, therefor.

In Column 6, Line 19, delete "element," and insert -- element. --, therefor.

In Column 8, Line 54, delete "423" and insert -- 423. --, therefor.

In the Claims

In Column 12, Line 4, in Claim 7, delete "used by used by" and insert -- used by --, therefor.

In Column 12, Line 28, in Claim 8, delete "more the" and insert -- more of the --, therefor.

In Column 13, Line 16, in Claim 14, delete "used by used by" and insert -- used by --, therefor.

In Column 13, Line 43, in Claim 15, delete "more the" and insert -- more of the --, therefor.

Signed and Sealed this
Twenty-eighth Day of July, 2020

Andrei Iancu
*Director of the United States Patent and Trademark Office*